US012080265B2

(12) United States Patent
Darlington

(10) Patent No.: US 12,080,265 B2
(45) Date of Patent: Sep. 3, 2024

(54) ACTIVE NOISE CANCELLING SYSTEM

(71) Applicant: DSP GROUP LTD., Herzelia (IL)

(72) Inventor: Paul Darlington, Aran-Villette (CH)

(73) Assignee: DSP GROUP LTD. (IL)

( * ) Notice: Subject to any disclaimer, the term of this patent is extended or adjusted under 35 U.S.C. 154(b) by 213 days.

(21) Appl. No.: 17/774,046

(22) PCT Filed: Oct. 30, 2020

(86) PCT No.: PCT/GB2020/052751
§ 371 (c)(1),
(2) Date: May 3, 2022

(87) PCT Pub. No.: WO2021/089987
PCT Pub. Date: May 14, 2021

(65) Prior Publication Data

US 2022/0383848 A1 Dec. 1, 2022

(30) Foreign Application Priority Data

Nov. 4, 2019 (GB) ..................................... 1916033

(51) Int. Cl.
*H04R 1/10* (2006.01)
*G10K 11/178* (2006.01)

(52) U.S. Cl.
CPC .. *G10K 11/17854* (2018.01); *G10K 11/17823* (2018.01); *G10K 11/17825* (2018.01);
(Continued)

(58) Field of Classification Search
CPC ....... G10K 11/17854; G10K 11/17823; G10K 11/17825; G10K 11/17881;
(Continued)

(56) References Cited

U.S. PATENT DOCUMENTS 5,937,070 A * 8/1999 Todter .................... H04M 1/19 381/71.8
9,293,128 B2 3/2016 Goldstein
(Continued)

OTHER PUBLICATIONS

International Search Report and Written Opinion, dated Feb. 15, 2021, from PCT Application No. PCT/GB2020/052751, 14 pages.

*Primary Examiner* — Carolyn R Edwards
*Assistant Examiner* — Friedrich Fahnert
(74) *Attorney, Agent, or Firm* — Paradice & Li LLP

(57) ABSTRACT

An active noise cancelling system (20) comprising: an earphone (8') comprising: an electro-acoustic driver (11); and at least one sensing microphone (12, 13); tunable active noise cancelling circuitry (7) operative to receive a signal from the at least one sensing microphone (12, 13), the tunable active noise cancelling circuitry (7) being pre-configured in a standard tuning for a reference ear and comprising at least one noise-control filter (14, 15); and a tuning module (24) operative to configure the earphone (8') for an individual wearer by: comparing acoustic coupling of the earphone (8') to the individual wearer's ear with acoustic coupling to the reference ear to determine a deviation in acoustic coupling; and using the determined deviation in acoustic coupling to modify the tunable active noise cancelling circuitry (7) by a predetermined degree based on the determined deviation in acoustic coupling.

29 Claims, 9 Drawing Sheets

(52) U.S. Cl.
CPC ..... *G10K 11/17881* (2018.01); *H04R 1/1083* (2013.01); *G10K 2210/1081* (2013.01); *G10K 2210/3026* (2013.01); *G10K 2210/3027* (2013.01); *G10K 2210/3028* (2013.01); *G10K 2210/3056* (2013.01); *H04R 2460/01* (2013.01)

(58) Field of Classification Search
CPC ... G10K 2210/1081; G10K 2210/3026; G10K 2210/3027; G10K 2210/3028; G10K 2210/3056; G10K 11/1783; G10K 11/1781; G10K 11/17815; G10K 11/17817; G10K 11/17813; H04R 1/1083; H04R 2460/01; H04R 3/005; H04R 2410/05; H04R 2460/15
USPC .......................................................... 381/71.6
See application file for complete search history.

(56) References Cited

U.S. PATENT DOCUMENTS

| | | | | |
|---|---|---|---|---|
| 9,473,845 | B2 | 10/2016 | Weil et al. | |
| 2014/0072135 | A1* | 3/2014 | Bajic ................ | G10K 11/17854 381/71.11 |
| 2016/0300562 | A1* | 10/2016 | Goldstein ........ | G10K 11/17879 |
| 2018/0122357 | A1* | 5/2018 | Thornock ............ | G10K 11/178 |

* cited by examiner

ACTIVE NOISE CANCELLING SYSTEM

CROSS REFERENCE TO RELATED APPLICATIONS

This application is a National Stage Entry filed under 35 U.S.C. 371 of PCT/GB2020/052751, filed Oct. 30, 2020, which claims priority to Great Britain Application No. 1916033.2, filed Nov. 4, 2019, all of which are assigned to the assignee hereof. The disclosures of all prior Applications are considered part of and are incorporated by reference in this Patent Application.

TECHNICAL FIELD

The present disclosure relates to an active noise cancelling system and particularly, but not exclusively to an active noise cancelling system for earphones having a leaky coupling to a wearer's external ear.

BACKGROUND OF THE RELATED ART

Earphones of the type intended to be worn substantially in the ear or in the concha have usually been provided with coupling means to ensure an effective seal between the acoustic output of the earphone and the wearer's ear. This seal is provided by an elastic component of the device. The presence of this seal confers several acoustic benefits, amongst which are an increase in the passive acoustic attenuation provided by the headphone and the creation of a simple acoustic radiation load for the miniature loudspeaker in the earphone. Nevertheless, the presence of the seal brings some negative system-level impacts to the earphone, including emphasis of the 'occlusion effect' and other consequences of sealing the ear canal, which some wearers find uncomfortable.

An alternative earphone design has recently found favour in the market, in which there is no explicit coupling means; the earphone is intended to operate with a more 'open' coupling to the external meatus. These earphones are referred to herein as 'leaky buds' to reflect the loose acoustic coupling between source and load.

In the course of development of a 'leaky bud' earphone, variation in the coupling between the earphone and the ear of each individual wearer has a strong impact upon the performance of the earphone. This person-to-person variation seen in the case of the leaky bud was partially mitigated in the case of traditional earphones with coupling managed by seals, effected by deformable grommets.

In the course of subsequent attempts to add to the acoustic utility of earphones of the 'leaky bud' type by the introduction of active noise control methods, it has been observed that the additional dependence upon the wearer's individual ear—caused by the absence of the seal—greatly complicates the practical deployment of active noise control methods.

Some competing attempts to address this problem have relied upon significant modifications to the acoustics of the earbud, so as to deliberately introduce leaks bigger than those arising from wearer-to-wearer variation (see for example U.S. Pat. No. 9,473,845 B2). These bigger leaks have the intention of short-circuiting the wearer-dependent leaks but have the unintended consequences of: i) short-circuiting radiation from the loudspeaker; and ii) adding passive noise transmission paths.

An alternative approach which might address wearer-to-wearer variation is the deployment of adaptive filtering methods (see for example U.S. Pat. No. 9,293,128 B2), in which an adaptive filter is used to create an estimate of the secondary acoustic path. This approach has enjoyed limited commercial success because of the complexity, cost and power consumption of the computing devices required to support this adaptive approach and, more importantly, because of the difficulty in providing the training signals required to direct convergence of the adaptive filters in the real-world context. It is emphasised that this difficulty impacts upon not only the prior art's ability to effect leak compensation, but also the ability of the prior art architecture to yield a viable noise cancelling system.

Aspects of the present disclosure recognize the need for an improved active noise cancelling system that address or at least alleviates problems associated with the prior art.

SUMMARY

In some aspects, there is provided an active noise cancelling system comprising: an earphone comprising: an electro-acoustic driver; and at least one sensing microphone; tunable active noise cancelling circuitry operative to receive a signal from the at least one sensing microphone, the tunable active noise cancelling circuitry being pre-configured in a standard tuning for a reference ear and comprising at least one noise-control filter; and a tuning module operative to configure the earphone for an individual wearer by: comparing acoustic coupling of the earphone to the individual wearer's ear with acoustic coupling to the reference ear to determine a deviation (e.g. degree of deviation) in acoustic coupling; and using the determined deviation in acoustic coupling to modify the tunable active noise cancelling circuitry by a predetermined degree based on the determined deviation in acoustic coupling.

In this way, an earphone system is provided which can be tuned (e.g. automatically tuned) to reduce deficiencies in ANC performance caused by poor acoustic coupling between the earphone and the wearer's ear.

In one embodiment, the earphone comprises: a body configured to be placed at the entrance to the auditory canal of a wearer's ear, the body housing an electro-acoustic driver and defining a passageway extending from the electro-acoustic driver to an opening in an outer surface of the body for allowing sound generated by the electro-acoustic driver to pass into the auditory canal of the wearer's ear.

In one embodiment, the earphone has a leaky coupling to the ear (e.g. it is not designed to fully seal a wearer's auditory canal when worn on the wearer's ear). Typically the earphone is configured to engage the concha (e.g. concha cavum) of a wearer's ear with little if any of the earphone penetrating the auditory canal of the wearer's ear.

In one embodiment, the body defines a rigid (e.g. non-compliant) ear-engaging outer surface.

In one embodiment, the rigid ear-engaging outer surface has a tapered profile having a cross-sectional area that increases with increased distance from the opening.

The active noise cancelling system may take the form of headphones (e.g. a pair of earphones connected together by a headband) or headbandless in-ear earphone units configured to be placed at the entrance to the auditory canal of a wearer's ear and held in place by engagement with the wearer's ears.

In one embodiment the tunable active noise cancelling circuitry and/or tuning module are provided as part of the earphone (e.g. housed in the body of the earphone). However, these components may also be provided remote from the earphone.

In one embodiment, the at least one sensing microphone comprises a feedback microphone (e.g. for sensing pressure changes in a volume (e.g. sealed or unsealed volume depending on the type of earphone) between the electro-acoustic driver of the earphone and the auditory canal of the wearer's ear).

In the case of a system comprising a feedback microphone, in one embodiment the tuning module is operative to: determine a voltage ratio of voltage supplied to the electro-acoustic driver and a resulting voltage generated at the feedback microphone; and determine a degree of deviation between the determined voltage ratio and a voltage ratio expected for the reference ear; and to use the degree of deviation in the ratios (e.g. deviation of the determined voltage ratio to the expected voltage ratio) to tune the active noise cancellation circuitry (e.g. by a fixed function of the detected deviation).

In one embodiment, the tuning module is operative to determine the degree of deviation between the determined voltage ratio and the voltage ratio expected for the reference ear by frequency domain analysis of the microphone and electroacoustic-driver voltage signals.

In one embodiment, the degree of deviation between the determined voltage ratio and the voltage ratio expected for the reference ear is estimated by transfer function estimation methods between the microphone and electroacoustic-driver voltage signals.

In one embodiment, the degree of deviation between the determined voltage ratio and the voltage ratio expected for the reference ear is estimated by analysing power spectral densities of the microphone and electroacoustic-driver voltage signals.

In one embodiment, the at least one sensing microphone comprises a feedforward microphone (e.g. for sensing sound external to the earphone e.g. for feedforward noise reduction or binaural monitoring/talk through function). In the case of a feedforward system, the at least one sensing microphone may additionally comprise the feedback microphone as previously defined (e.g. to measure the coupling of the earphone to the wearer's ear as part of a "hybrid system").

In the case of a system comprising both a feedback microphone and a feedforward microphone ("hybrid system"), the tuning module may be operative to: determine a pressure difference (or "pressure gradient") corresponding to a difference in pressure readings between the feedback microphone and the feedforward microphone (e.g. measure the difference in voltage generated at the feedback microphone compared with the voltage generated at the feedforward microphone); determine a degree of deviation between the determined pressure gradient and a pressure gradient expected for the reference ear; and to use the degree of deviation in the pressure gradients (e.g. deviation of the detected pressure gradient relative to the expected pressure gradient) to tune the active noise cancellation circuitry (e.g. by a fixed function of the detected deviation). In one embodiment, the tuning module is operative to determine the degree of deviation between the determined pressure gradient and the pressure gradient expected for the reference ear by frequency domain analysis of the feedback and feedforward microphone signals.

In one embodiment, the degree of deviation between the determined pressure gradient and the pressure gradient expected for the reference ear is estimated by transfer function estimation methods between the feedback and feedforward signals.

In one embodiment, the degree of deviation between the determined pressure gradient and the pressure gradient expected for the reference ear is estimated by analysing power spectral densities of the feedback and feedforward signals.

In one embodiment, the at least one noise-control filter comprises an analogue filter and/or digital (e.g. algorithm-based) filter.

In one embodiment, the at least one noise-control filter defines a set (e.g. plurality) of adjustable parameters.

In one embodiment the at least one noise-control filter is a programmable filter.

In the case of a system comprising a feedback microphone, the at least one noise-control filter may comprise a feedback control filter.

In the case of a system comprising a feedforward microphone, the at least one noise-control filter may comprise a feedforward control filter.

In one embodiment, the tunable active noise cancelling circuitry comprises a variable gain device (e.g. programmable gain amplifier or a programmable attenuator) operative to apply a multiplier (e.g. >1 or <1) to a signal supplied to or from the noise-control filter (e.g. feedback control filter or feedforward control filter).

In a first set of embodiments, the feedforward control filter comprises an adjustable filter.

In one embodiment, the adjustable filter is configured to attenuate upper frequency parts of a frequency range under feedforward control.

In one embodiment, the adjustable filter comprises a (e.g. single) biquadratic filter.

In a second set of embodiments, the feedforward control filter comprises a pair of filters.

In one embodiment, the pair of filters are configured to permit adjustment (e.g. independent adjustment) of gain applied to upper and lower frequency portions respectively of a frequency range under feedforward control.

In one embodiment, one of the pair of filters is fixed and the other is adjustable.

In one embodiment, one of the pair of filters (e.g. the fixed filter) is a high boost shelf and the other (e.g. the adjustable filter) is a low boost shelf.

In one embodiment, the pair of filters each comprise biquadratic filters.

In a third set of embodiments, the feedforward control filter comprises a fixed filter operated with variable gain.

In one embodiment, the fixed filter is configured to attenuate upper frequency parts of a frequency range under feedforward control.

In one embodiment, the fixed filter comprises a (e.g. single) biquadratic filter.

In the case of a system comprising both a feedback microphone and a feedforward microphone ("hybrid system"), the feedback control filter may be associated with a first variable gain device and the feedforward control filter may be associated with a second variable gain device operative independently of the first variable gain device.

In one embodiment, the tuning module is operative to compare acoustic coupling by comparing low frequency acoustic coupling to the wearer's ear with corresponding low frequency coupling to the reference ear.

For the purposes of the present disclosure, low frequency is defined as relating to frequencies below 500 Hz (e.g. lower than 400 Hz, e.g. around 200 Hz).

In one embodiment, the tuning module is operative to compare a low frequency transfer function (e.g. low frequency open-loop transfer function) of the system to the wearer's ear with a corresponding low frequency transfer function (e.g. corresponding low frequency open-loop transfer function) of the system to the reference ear.

In the case of tunable active noise cancelling circuitry comprising a variable gain device, the tuning module may be operative to achieve tuning by modifying a gain change of the variable gain device in proportion to the detected deviation. For example, in the case of a system comprising a feedback microphone, the tuning module may be operative to adjust the loop gain (e.g. low frequency loop gain) of the system to correct the feedback noise cancellation performance. In the case of a system comprising a feedforward microphone, the tuning module may be operative to adjust the path gain (e.g. low frequency path gain) of the system to correct the feedforward noise cancellation performance.

In one embodiment, the determination of the deviation (e.g. degree of deviation) in acoustic coupling (e.g. detection of deviation between an instance of the voltage ratio and the standard voltage ratio) and modification of the tunable active noise cancelling circuitry by a predetermined degree based on the determined deviation in acoustic coupling are performed automatically by the system.

In one embodiment, the tuning module is operative to modify an aspect of the noise-control filter in proportion to the detected degree of deviation in acoustic coupling.

In one embodiment, the tuning module is operative to modify a dominant peak section of the feedback control filter in proportion to the detected degree of deviation in acoustic coupling.

In one embodiment, the active noise cancelling system further comprises a memory and the pre-configured standard tuning is stored in the memory.

In one embodiment, the system is operative to save the detected deviation or a corresponding tuning value in the memory. In this way, the degree of deviation (or the associated tuning value) may be saved through power-down, such that the system can retrieve the deviation value when switched on. Accordingly, there is no need to acquire a new estimate of the acoustic coupling with the wearer's ear.

In one embodiment, the system is operative to record both an audio signal applied to the electro-acoustic driver (e.g. playback audio signal or test signal) and a microphone signal (e.g. feedback microphone signal). In the case of a "hybrid system", the system may be operative to record both the feedback microphone signal and the feedforward microphone signal. These signals may be recorded in a synchronously sampled data frame (e.g. allowing moving, phase-coherent estimates of the transfer function between the electro-acoustic driver and feedback microphone/between the feedback and feedforward microphones to be made).

In one embodiment, the tuning module is programmed to determine the deviation in acoustic coupling over substantially a single frequency range (e.g. substantially a single frequency).

In another embodiment, the tuning module is programmed to determine the deviation in acoustic coupling at a plurality of different frequency ranges (e.g. a plurality of different single frequencies) and determine an average deviation in acoustic coupling.

In one embodiment, the tuning module is programmed to repeatedly (e.g. continuously) determine the deviation in acoustic coupling (e.g. for a single frequency range or a plurality of different frequency ranges).

In one embodiment, the tuning module is programmed to determine the deviation in acoustic coupling at regular intervals (e.g. every 100-1000 ms, e.g. every 200-500 ms). In this way, the deviation may be continuously observed with an averaging time constant appropriate to track changes in fit to an individual wearer (e.g. to take account of movement of the earphone relative to the wearer's ear during use).

In one embodiment, the system comprises a supervisory component.

In one embodiment, the supervisory component is operative to monitor for the presence of an audio signal (e.g. audio playback signal or test signal (e.g. applied to the electro-acoustic driver)) and the tuning module is operative to observe (e.g. once or repeatedly) the deviation in acoustic coupling whilst the audio signal is observed by the supervisory component.

In one embodiment, the supervisory component is operative to request an audio signal (e.g. request an audio playback signal from a playback system or to request a test signal from a test signal resource (e.g. applied to the electro-acoustic driver)) and the tuning module is operative to observe (e.g. once or repeatedly) the deviation in acoustic coupling whilst the audio signal is observed by the supervisory component. In one embodiment, the supervisory component operates in this way during a calibration mode selected by the wearer. In another embodiment, the supervisory component operates in this way at power-on and/or at regular intervals during periods in which no audio playback is observed by the supervisory component.

In the case of a system comprising a feedforward microphone, in one embodiment the supervisory component monitors external ambient pressure sensed by the feedforward microphone and compares the external ambient pressure to the audio playback level.

In one embodiment, the supervisory component is operative to prevent operation of the tuning module (e.g. to determine the deviation in acoustic coupling and/or tuning of the tunable active noise cancelling circuitry) if a determined ratio of the audio playback level to external ambient pressure is below a threshold value. In this way, the system may be configured to avoid tuning of the tunable active noise cancelling circuitry in high ambient noise conditions and thereby reduce the likelihood of mistuning.

In the case of a hybrid system, the supervisory component may be configured to: monitor for the presence of external ambient pressure sensed by the feedforward microphone (e.g. the presence of external ambient pressure over a predetermined threshold value); and prevent operation of the tuning module (e.g. to determine the deviation in acoustic coupling and/or tuning of the tunable active noise cancelling circuitry) when external ambient pressure sensed by the feedforward microphone is determined not to be present (e.g. is below the predetermined threshold value).

In one embodiment, the supervisory component is configured to monitor the pressure gradient estimates produced by the tuning module. In one embodiment, the supervisory component is operative to classify the pressure gradient estimates into groups associated with: i) external sound sources; ii) near-end voice; iii) sound originating from the electro-acoustic driver; and iv) a mix of the groups i)-iii). In one embodiment, the classification is made on the basis of some simple heuristic rules: group i) is associated with strong negative pressure gradients, group ii) with pressure gradients close to zero in the octave bands from 125 Hz to 1 kHz, group iii) with strong positive pressure gradients and group iv) by exception. In one embodiment, only estimates associated with group i) are used for determining the degree of acoustic coupling using the pressure gradient method, hence the tuning module is prevented from operating when group i) pressure is not identified by the supervisory component as being present.

In one embodiment, the tuning module is operative to: perform the acoustic coupling comparison step by assessing acoustic coupling over a first frequency range (e.g. substantially a single first frequency); and adjust performance of the tunable active noise cancelling circuitry over a second frequency range (e.g. substantially a single second frequency) different to the first frequency range.

In one embodiment, the first frequency range ("higher frequency range") covers higher frequencies than the second frequency range ("lower frequency range").

In this way, the comparison of acoustic coupling of the earphone to the individual wearer's ear with acoustic coupling to the reference ear to determine a deviation in acoustic coupling is performed at one, higher frequency in order to infer the behaviour at a second lower frequency at which adjustments are made to modify the tunable active noise cancelling circuitry by a predetermined degree based on the determined deviation in acoustic coupling at the first, higher frequency.

In one embodiment, the first frequency range is centred around a relatively high frequency and the second frequency range is centred around a relatively low frequency.

In one embodiment, the first and second frequency ranges are non-overlapping.

For example, in the case of a hybrid system operative to determine the pressure gradient between feedback and feedforward microphone signals, the determined pressure gradient may be compared with the pressure gradient expected on the reference ear at any frequency or over a band of frequencies (such as an octave band) which are significantly different from those low frequencies at which leak compensation of active noise compensation may be expected to operate. For example, observation of detected deviation in pressure gradient at 805 Hz (or over a band of frequencies centred around 805 Hz) may provide information sufficient to adjust the tuning of the tunable active noise cancelling circuitry operating with peak active attenuation at 120 Hz.

In some other aspects, there is provided a method of operating an active noise cancelling system, said system comprising: an earphone comprising: an electro-acoustic driver; and at least one sensing microphone; tunable active noise cancelling circuitry operative to receive a signal from the at least one sensing microphone, the tunable active noise cancelling circuitry being pre-configured in a standard tuning for a reference ear and comprising at least one noise-control filter; and a tuning module; wherein the method comprises: the tuning module configuring the earphone for an individual wearer by: comparing acoustic coupling of the earphone to the individual wearer's ear with acoustic coupling to the reference ear (e.g. whilst the earphone is in use positioned in or on the user's ear) to determine a deviation in acoustic coupling; and using the determined deviation in acoustic coupling to modify the tunable active noise cancelling circuitry by a predetermined degree based on the determined deviation in acoustic coupling.

In one embodiment, the at least one sensing microphone comprises a feedback microphone and the at least one noise-control filter comprises a feedback control filter.

In one embodiment, the step of comparing acoustic coupling of the earphone comprises: determining a voltage ratio of voltage supplied to the electro-acoustic driver and a resulting voltage generated at the feedback microphone; determining a degree of deviation between the determined voltage ratio and a voltage ratio expected for the reference ear; and using the degree of deviation in the ratios to tune the tunable active noise cancellation circuitry.

In one embodiment, the at least one sensing microphone comprises a feedforward microphone and the at least one noise-control filter comprises a feedforward control filter.

In one embodiment, the step of comparing acoustic coupling of the earphone comprises: determining a pressure gradient corresponding to a difference in pressure readings between the feedback microphone and the feedforward microphone; determining a degree of deviation between the determined pressure gradient and a pressure gradient expected for the reference ear; and using the degree of deviation in the pressure gradients to tune the active noise cancelling circuitry.

In one embodiment, the step of determining the deviation in acoustic coupling is performed automatically and continuously whilst the active noise cancelling system is in use (i.e. with the earphone positioned in or on the user's ear).

In one embodiment, the system further comprises a supervisory component.

In one embodiment, the supervisory component monitoring for the presence of an audio signal (e.g. an audio signal requested by the supervisory component); and the step of comparing acoustic coupling of the earphone comprises: observing the deviation in acoustic coupling only whilst the audio signal is observed by the supervisory component.

In one embodiment, the supervisory component performs the steps of: monitoring external ambient pressure sensed by the feedforward microphone and comparing the external ambient pressure to the audio playback level; and preventing operation of the tuning module if a determined ratio of the audio playback level to external ambient pressure is below a threshold value.

In one embodiment, the supervisory component performs the steps of: monitoring for the presence of external ambient pressure sensed by the feedforward microphone; and preventing operation of the tuning module when external ambient pressure sensed by the feedforward microphone is determined not to be present.

In one embodiment, the step of comparing acoustic coupling of the earphone is performed over a first frequency range (e.g. substantially a single first frequency); and the step of modifying the tunable active noise cancelling circuitry by a predetermined degree is performed over a second frequency range (e.g. substantially a single second frequency) different to the first frequency range.

In one embodiment, the first frequency range ("higher frequency range") covers higher frequencies than the second frequency range ("lower frequency range").

In one embodiment, the first frequency range is centred around a relatively high frequency and the second frequency range is centred around a relatively low frequency.

In one embodiment, the first and second frequency ranges are non-overlapping.

In one embodiment, the active noise cancelling system is a system in accordance with any embodiments of the present disclosure.

Embodiments of the present disclosure will now be described by way of example with reference to the accompanying drawings, in which.

Figure 14:
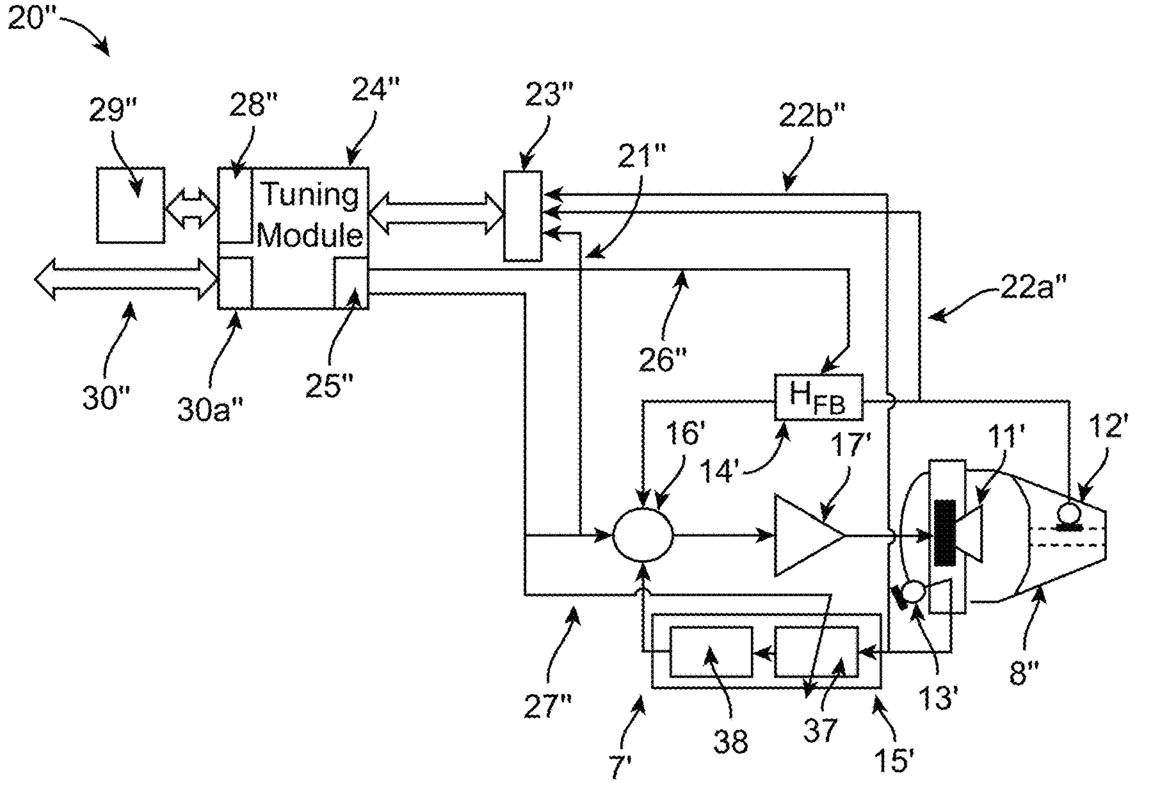
FIG. 14 is a schematic illustration of an active noise cancellation system in accordance with some embodiments.
Figure 17:
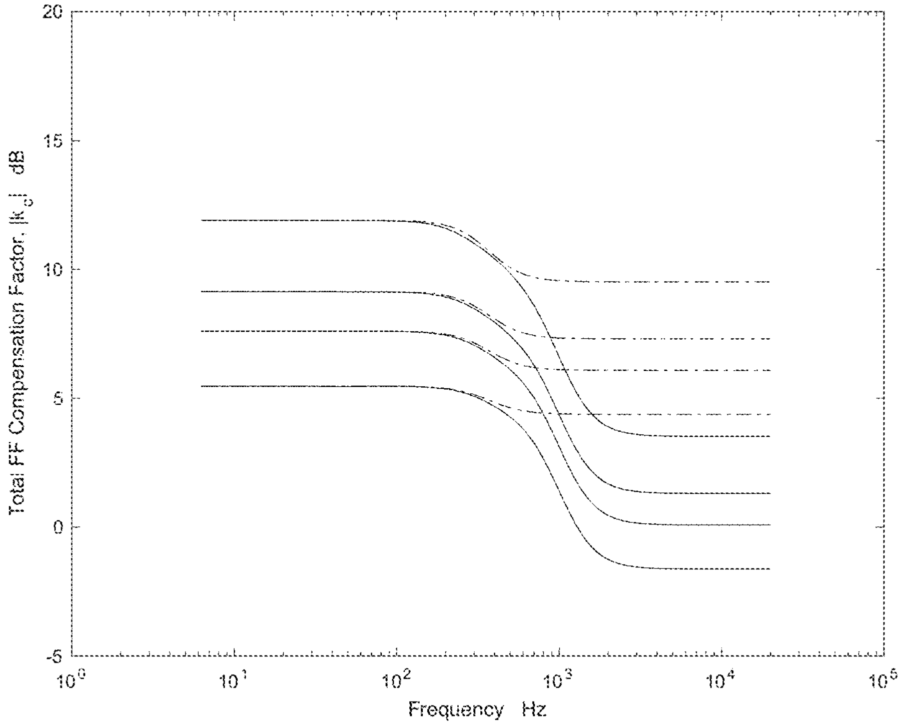
Figure 18:
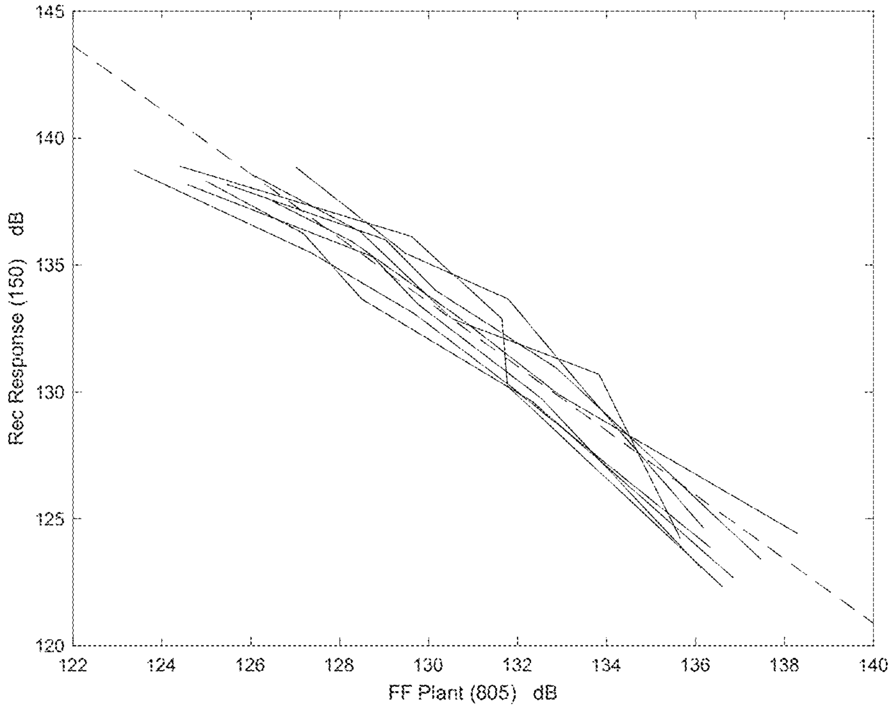

FIG. 17 shows the overall magnitude frequency responses of a single, fixed biquadratic compensating filter, having variable gain, for use in the active noise cancellation system of FIG. 14 configured for various degrees of leak; and FIG. 18 shows the relationship between the measured plant response at a higher frequency and the measured receiving response at a lower frequency on 8 human ears in five various degrees of leak.

Figure 1:
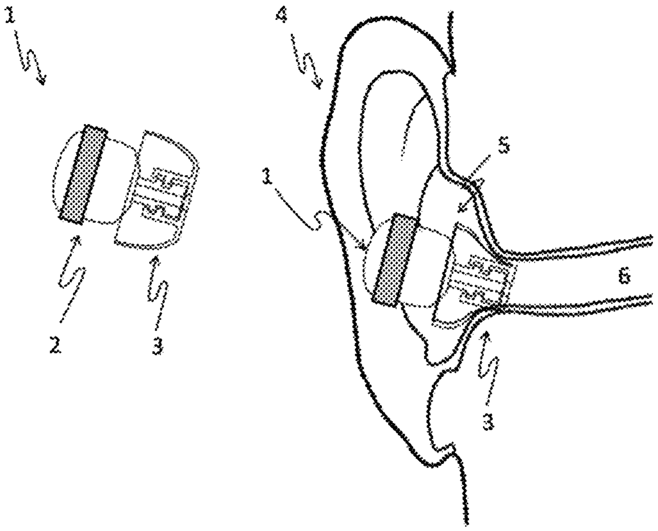
Figure 1 (PRIOR ART)
FIG. 1 is a schematic illustration of an earphone of traditional construction, showing how it achieves a sealed coupling to the ear.

FIG. 1 shows a prior art earphone 1 of conventional type, having a body 2 and a flexible tip or 'grommet' 3, designed to provide mechanical and acoustical seal to the ear. When the earphone 1 is placed in the ear 4, it occupies the concha 5 and the tip 3 engages with the interface between the concha and the distal end of the external auditory meatus or 'ear canal', 6, where elastic deformation of the grommet 3 effects the seal.

Figure 2:
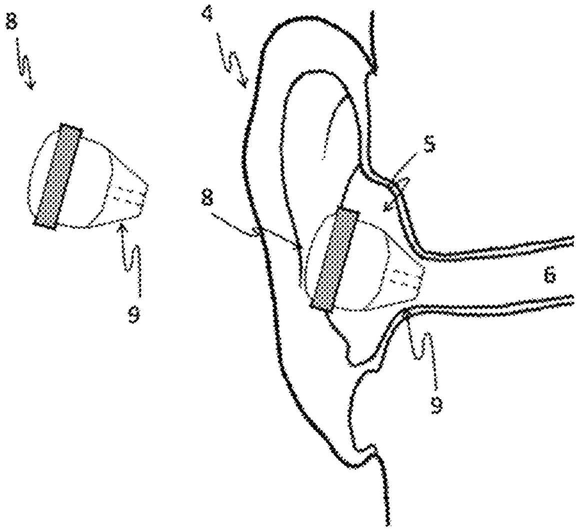
Figure 2 (PRIOR ART)
FIG. 2 is a schematic illustration of a prior art earphone intended to achieve a 'leaky' coupling to the wearer's ear.

FIG. 2 shows a prior art earphone 8 of 'leaky bud' type, where the broadly conical nozzle 9 is expected to produce a leaky acoustical interface to the wearer's ear. When the earphone 8 is placed into the ear 4, it occupies the concha 5 and the nozzle 9 engages with the transition between the concha and the distal end of the external auditory meatus or 'ear canal', 6.

Depending upon the relative size and shape of the earphone 8 (and particularly the nozzle 8) and the user's ear 4 (and particularly details of the transition between the concha 5 and the distal end of the ear canal 6), a partial seal is made between earphone 8 and ear 4. In some wearers the seal is remarkably effective, even though the body of the nozzle is rigid and impervious. In other wearers there is no seal. Most wearers will experience significant change in the degree of seal as the earphone moves slightly within the ear; this is a manifestation of the change of performance with individual 'fit', as opposed to performance variation from wearer to wearer. Aspects of the present disclosure can be used to compensate for the effects of fit.

Figure 3:
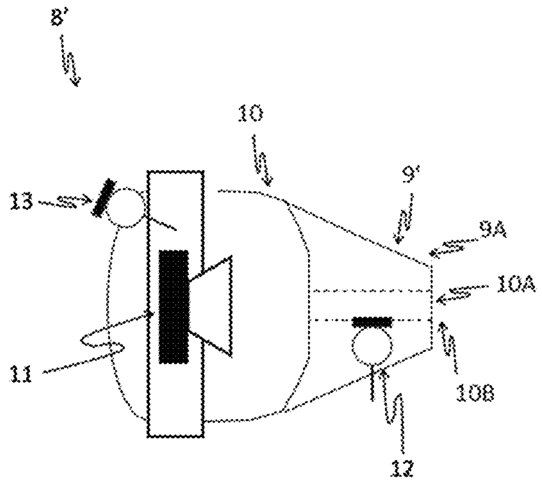
FIG. 3 is a schematic illustration of a 'leaky bud' earphone.

FIG. 3 shows an earphone 8' of 'leaky bud' type, equipped with transducers sufficient to support hybrid active noise control. The earphone comprises a body 10 housing a conventional electro-acoustic driver (a miniature loudspeaker or 'receiver') 11, the body 10 defining a passageway 10A extending from the electro-acoustic driver 11 to an opening 10B in the body. The body 10 has a frustro-conical nozzle portion 9' defining a tapered ear-engaging surface 9A configured to engage the concha of a wearer's ear. It also includes a microphone 12 sensitive to the pressure inside the nozzle 9, which will consist of the front radiation from the receiver 11 and sound loosely coupled from the ear and the environment. This microphone 12 is used to provide the control signals upon which to base a 'feedback' noise canceller and is, therefore, called the 'feedback' microphone. The earphone 8' further incorporates a second microphone 13, positioned so as to be sensitive to pressures external to the ear. This microphone is intended to provide reference pressure for use in a 'feedforward' noise cancelling architecture and is, therefore, called the 'feedforward' microphone. The feedforward microphone is positioned (and both acoustically and mechanically isolated) so as to minimise its sensitivity to radiation from the receiver 11.

Figure 4:
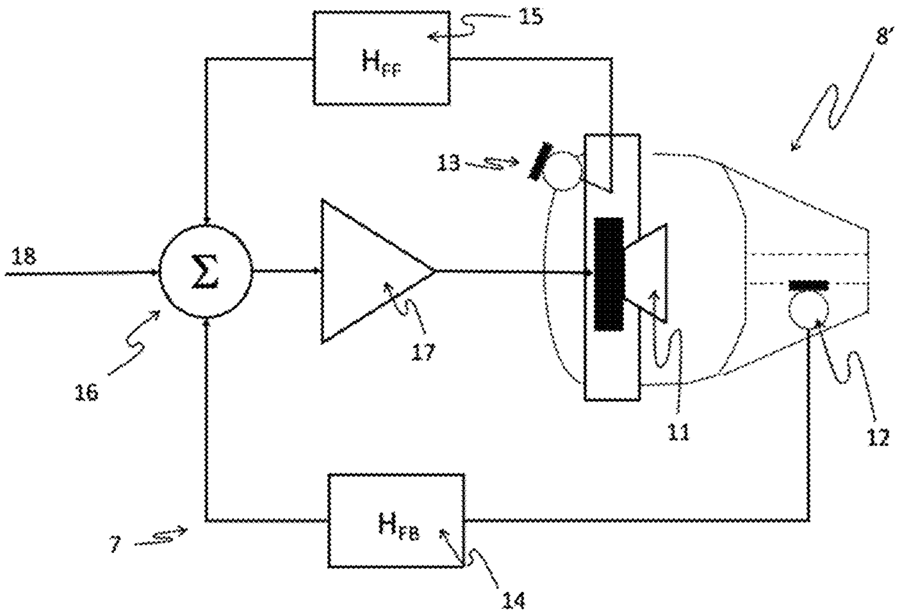
FIG. 4 is a schematic illustration of an earphone for use in an active noise cancellation system based on the earphone of FIG. 3.

FIG. 4 shows the earphone 8' from FIG. 3 deployed within a tunable 'hybrid' noise cancelling topology circuitry 7 comprising filters 14, 15 together with summing mode 16 and amplifier 17, in which there is provision for both feedback and feedforward control. Signals from the feedback microphone 12 are passed through a filter 14 capable of implementing the reference tuning and being adjusted to express the deviation between any individual wearer and the reference. This deviation may (e.g.) be expressed by scalar multiplication (i.e. a gain change), by a modification of the parameters of the peak section of the filter 14, or by more significant modification/reconfiguration of filter 14 (which may be an analogue or digital filter defining a set of parameters).

Signals from the feedforward microphone 13 are passed through a filter 15 capable of implementing the reference tuning and being adjusted to express the deviation between any individual wearer and the reference. This deviation may (e.g.) be expressed by scalar multiplication (i.e. a gain change) or by more significant modification/reconfiguration of filter 15.

The filtered microphone signals are combined at the summing node 16 and passed to the amplifier 17, which drives the receiver 11. Other signals, such as audio program for entertainment or communication or test signals required to measure the low frequency receiving sensitivity of the system are applied to the summing node at signal input 18.

Figure 5:
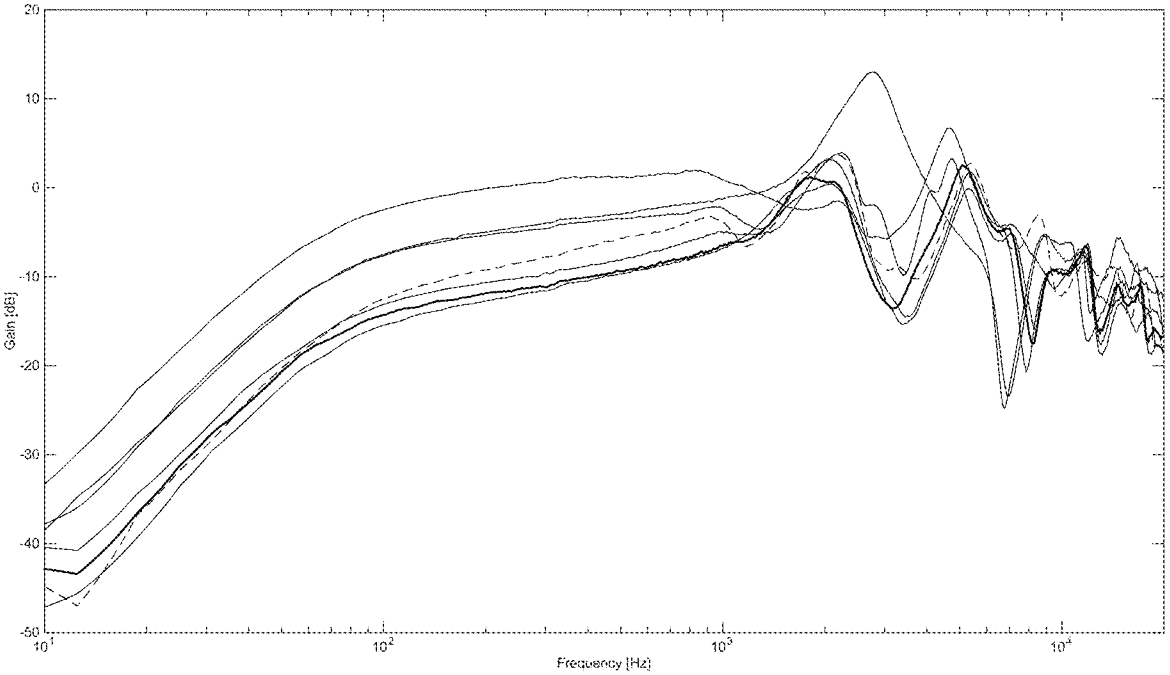
FIG. 5 shows a series of measurements of the ratio of applied voltage at the terminals of an earphone having leaky coupling to the ear and resulting voltage at the terminals of a microphone sensitive to pressure inside the 'nozzle' of said earphone, thereby representing the receiving response, for seven subjects.
Figure 6:
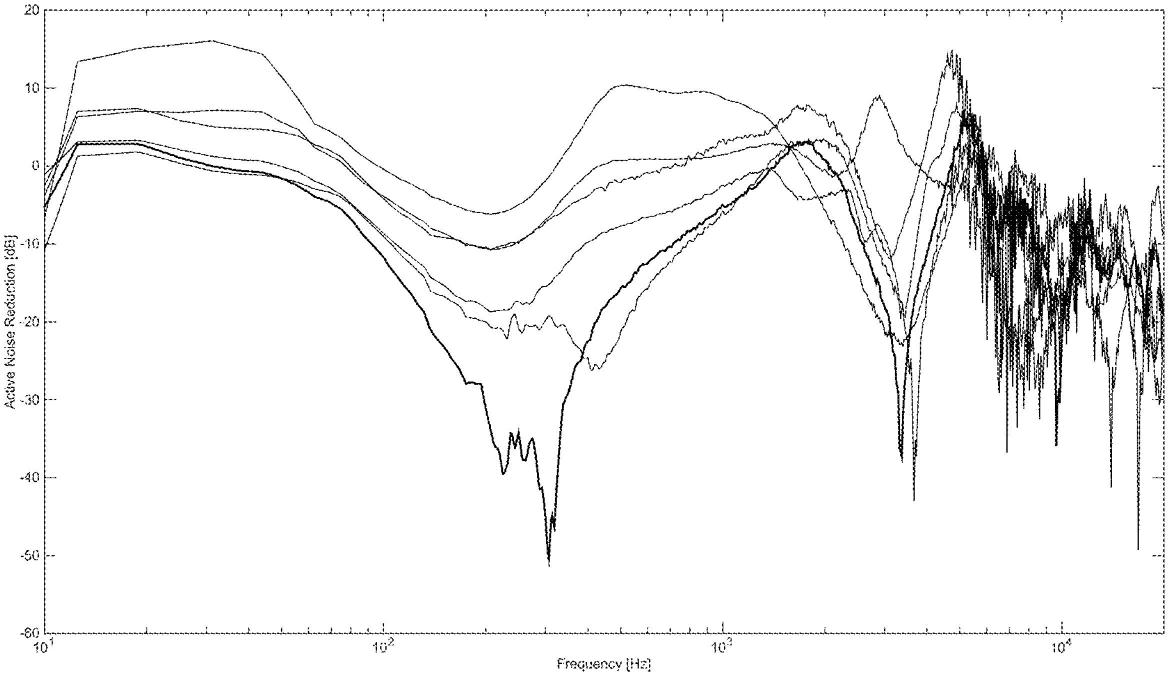
FIG. 6 shows the performance of an earphone having leaky coupling to the ear operating in an active noise cancelling system with fixed tuning.

FIGS. 5 and 6 present a validation of a central proposition of the present embodiments; specifically that the performance of a noise cancelling earbud with leaky coupling to the ear and fixed tuning is not useful over a range of wearers yet can be recovered by simple application of a gain correction functionally derived from the observed deviation in low frequency receiving sensitivity. For simplicity, in the case taught herein the functional relationship is a linear relationship but more complex relationships may be implemented.

FIG. 5 shows the ratio of applied voltage to the receiver 11 of a leaky earbud to the voltage generated at the feedback microphone 12 for seven subjects, measured in a pseudo-diffuse noise field. This ratio is the 'feedback plant' response. The emboldened trace of FIG. 5 is the subject for whom the reference tuning is developed. The dashed trace of FIG. 5 is an additional subject who will be used in validation of the process (to be reported in FIG. 9). Note the range of receiving sensitivities demonstrated by these 'plant responses' at low- and mid-frequencies (below 1 kHz). This is evidence of the varying degree of leak caused by the coupling between the earbud nozzle 9 and the individual wearer's ear.

FIG. 6 shows the Active Noise Reduction achieved when a noise control system with fixed tuning, designed for the reference subject, is used with the leaky bud and the same six subjects reported by continuous traces in FIG. 5. The emboldened trace is the reference subject, who (naturally) experience the best noise cancellation. Other wearers experience poor performance, with several wearers experiencing enhancement of noise, particularly at low frequency (<100 Hz) or over the psycho-acoustically important region from 500-2 kHz.

Figure 7:
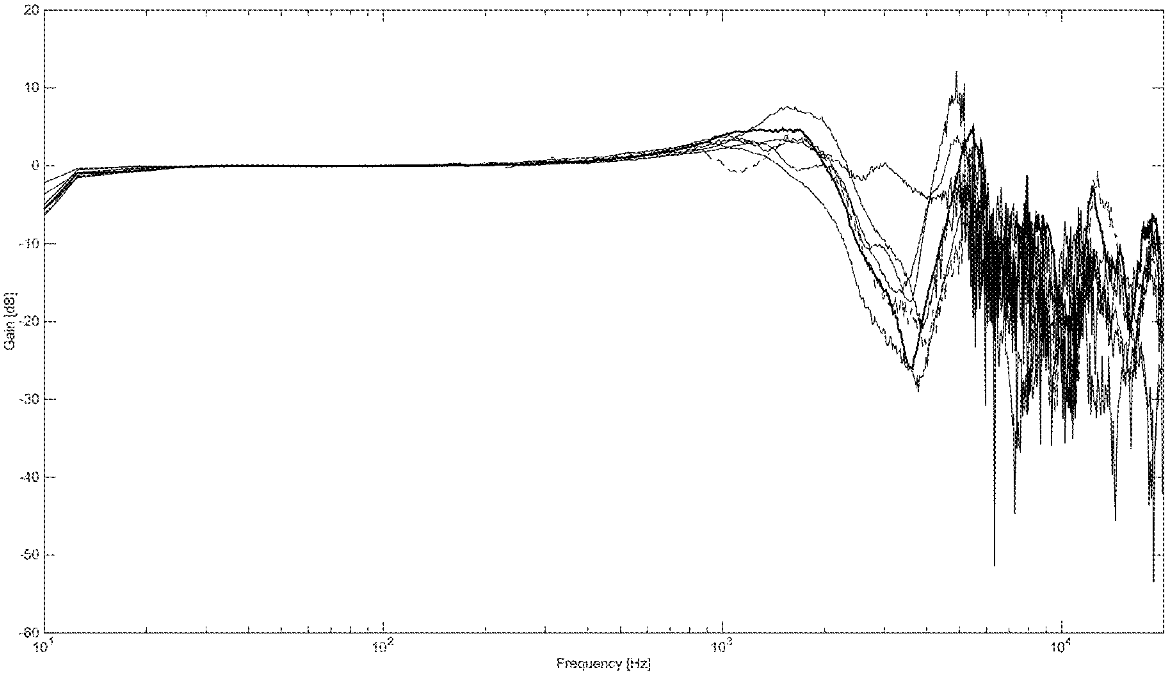
FIG. 7 shows a series of measurements of the ratio of the pressures at the external and internal microphones of an earphone having leaky coupling to the ear.

FIG. 7 shows the ratio of the voltage outputs from the feedback and feedforward microphones of a leaky earbud, worn by the same subjects as those reported in FIG. 5 in a pseudo-diffuse field. Unlike the former case, this 'feedforward plant' response shows little wearer dependence. Rather, it is surprisingly constant.

The six subjects in FIG. 5 whose 'feedback plant' responses were reported by continuous lines participated in an experiment. The single reference tuning (developed for the subject with the feedback plant response described by the emboldened trace in FIG. 5) was used by all six subjects and the gain of their feedforward controllers was manually adjusted until both i) the noise cancelling performance measured at the feedback microphone was observed to reach optimal level, whilst monitored on an audio analyser and ii) the reported subjective level of noise cancelling reached an optimum. The feedforward gain adjustment which delivered this optimal noise cancellation was noted for each wearer.

Figure 8:
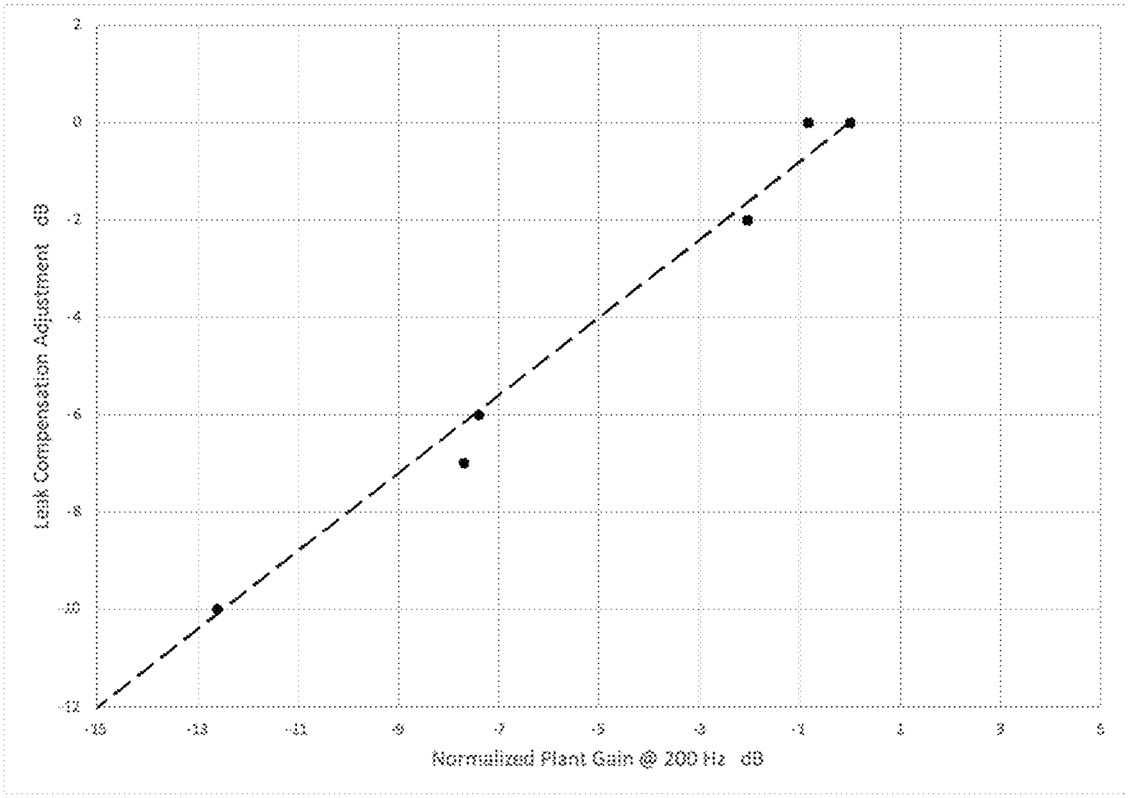
FIG. 8 shows the relationship between a parameter of the measured receiving response (FIG. 5) and the Feedforward path Gain for Optimal Active Noise Cancellation.

FIG. 8 shows the gain adjustments found to result in optimal active noise cancellation, plotted against a simple scalar measure of deviation between the individual's feedback plant response and that of the reference user. It is seen that these follow a functional relationship, as is anticipated. In this case, the 'simple scalar measure of deviation between the individual plant feedback plant response and that of the reference user' was simply the magnitude difference at 200 Hz and FIG. 8 reveals the functional relationship to be linear.

In practice, the feedback plant response may be interrogated at more than one frequency and a weighted average of the differences at these frequencies computed to compare the feedback plant response of a wearer with that of the reference. This will yield a more robust estimate of the deviation between the leak conditions of an individual wearer and that experienced by the reference wearer, but it is won at additional computational load. In practice, the additional computational load is likely to be insignificant if adding <~7 more frequencies.

Figure 9:
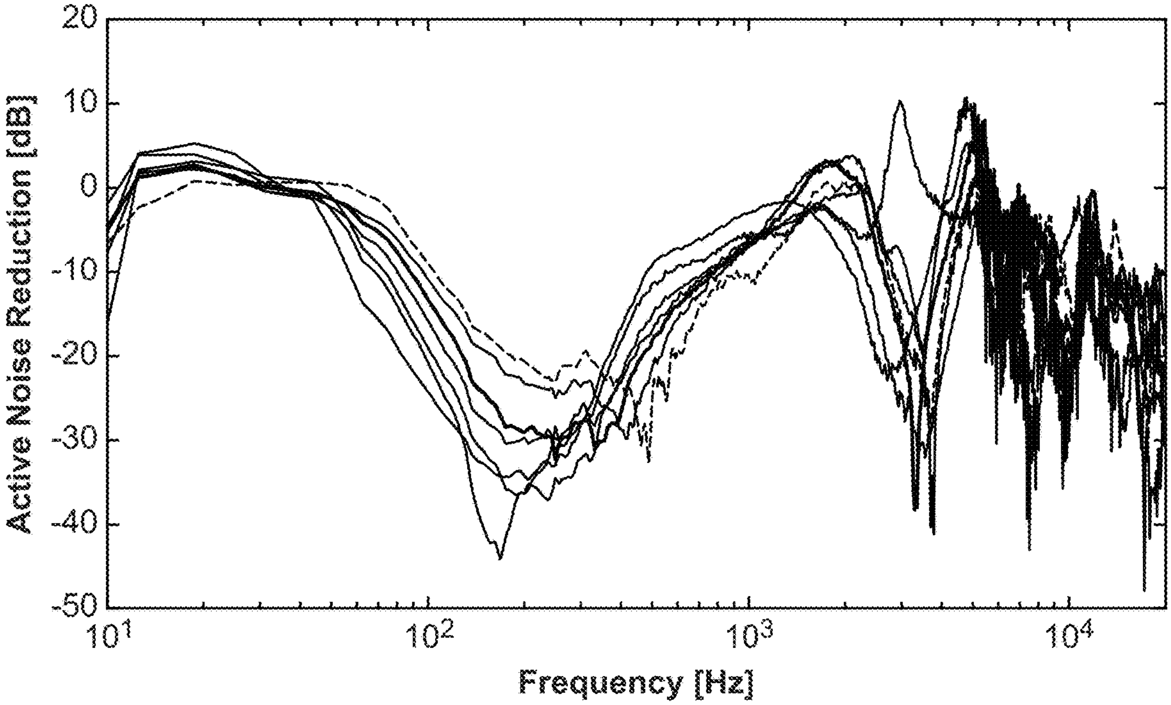
FIG. 9 shows the performance of an earphone having leaky coupling to the ear operating in an active noise cancelling system with fixed tuning but with the controller gain adjusted according to the rule identified in FIG. 8.

FIG. 9 shows the Active Noise Reduction achieved when the same noise control system with fixed tuning, designed for the reference subject, is used with the leaky bud and the seven subjects reported in FIG. 5. Notice that all wearers experience good noise cancelling performance, with no wearer suffering enhancement. The performance curves described by continuous traces all have their feedforward controller gain adjusted according to the findings of the experiment described above and specified in FIG. 8. The performance curve described by the dashed line relates to a subject who did not participate in the experiment. This performance was achieved by identification of the subject's feedback plant deviation from (the dashed line in) FIG. 5 and derivation of an associated gain adjustment by passing this deviation into the function described by FIG. 8. The resulting gain correction immediately produced the 'leak compensated' performance described in FIG. 9 for this subject. This has been repeated for other subjects, validating the process.

The present embodiments are agnostic to the means by which the feedback plant response is measured but practical exploitation of the embodiments is impossible in the absence of means to estimate this feature of earphone behaviour in vivo.

Figure 10:
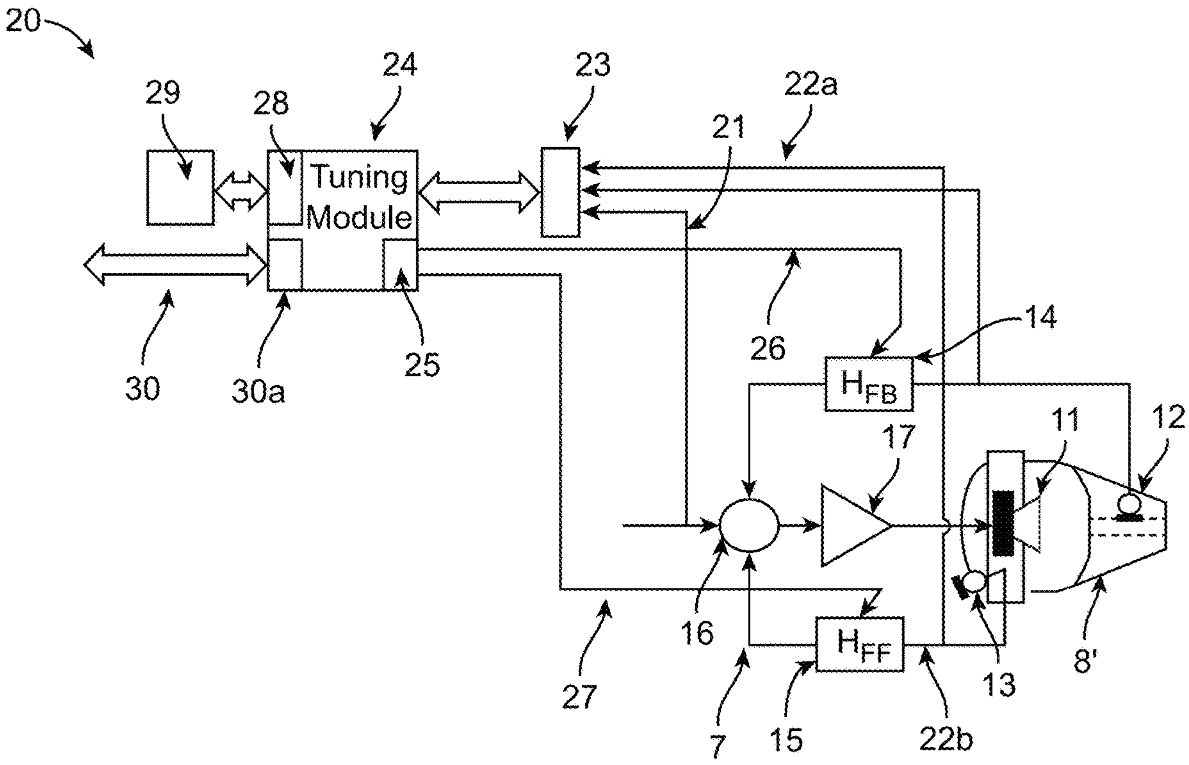
FIG. 10 is a schematic illustration of an active noise cancellation system in accordance with some embodiments.

FIG. 10 shows an active noise cancelling system 20 incorporating the 'leaky bud' earphone 8' of FIG. 4 including tunable 'hybrid' noise cancelling topology circuitry 7 as previously described. System 20 comprises a processing element 24 operative to perform a supervisory function and which is capable of observing the audio playback signal 21 and the output 22*a* of the feedback microphone 12 through a data converter 23 and to perform a tuning module function. Note that presence of the data converter 23 does not imply the presence of an analogue feedback signal; any of the signals 21, 22*a* and 22*b* (the output of the feedforward microphone 13) may be represented as analogue or digital signals without prejudice or limitation. These observations pass from the data converter 23 to processing element 24, usually implemented as a microcontroller or similar programmable device, capable of operating upon the signal observations.

The typical observations required to sustain the estimation of low frequency feedback plant estimation involve assembly of time aligned frames of the two signals described above, (optional) imposition of a time-domain window, computation of Fourier Transforms, and maintenance of auto- and cross-spectral estimates. From these estimates, the required deviations from a reference feedback plant magnitude can be computed.

The maintenance of auto- and cross-spectral estimate involves explicit averaging processes which advantageously are implemented using simple first order filters with long time constants of the order of one second. Such averaging is useful in establishing the noise immunity which allows the transfer function estimation to reject the corrupting influence of noise sources such a ambient sound sources, which otherwise corrupt the correct estimation of the receiving response. The averaging time constant should not be too long, as it is useful for the system to be able to track changes in the low frequency coupling between the earphone and the ear with one wearer. Such changes occur inevitably as the earphone moves slightly with use; this is known as 'fit'.

Aspects of the present disclosure can be used to address changes in noise cancelling performance with one wearer over time associated with fit, as long as continuous observations of low frequency coupling are made with an automatic system, such as that described above. This requires careful choice of averaging time constant; sufficiently long to ensure good noise rejection, sufficiently short to give good tracking of changes due to fit.

The active noise cancelling system 20 is equipped with an interface 25 suitable to pass control outputs 26 and 27 to modify the feedback and feedforward filters 14, 15 respectively, so as to effect leak compensation according to the observed feedback plant deviation.

The active noise cancelling system 20 is further equipped with an interface 28, internally or externally, to memory element(s) 29. These memory elements 29 allow the system to store the recent values of observed feedback plant deviation, such that the system powers up in a state appropriate for its owner, without having to wait for convergence of a new estimate of feedback plant deviation.

Additionally, the active noise cancelling system 20 has a further capability to support an interface 30 (via an interface component 30*a*) for User interface or control by a Host device, such that its operation may by modified or suspended, as appropriate.

Aspects of the present disclosure are particularly facilitated when design of the earbud earphone 8' (and its integral transducers 11, 12, 13) anticipates application within a system such as that shown in FIG. 10, wherein active measures to compensate for leak are applied. Design for active leak compensation may include: i) placement of the error microphone 12 closer to the outer (ear) end of the nozzle 9' of the earbud earphone 8'; and ii) should ensure earbud design with low nozzle impedance.

Figure 11:
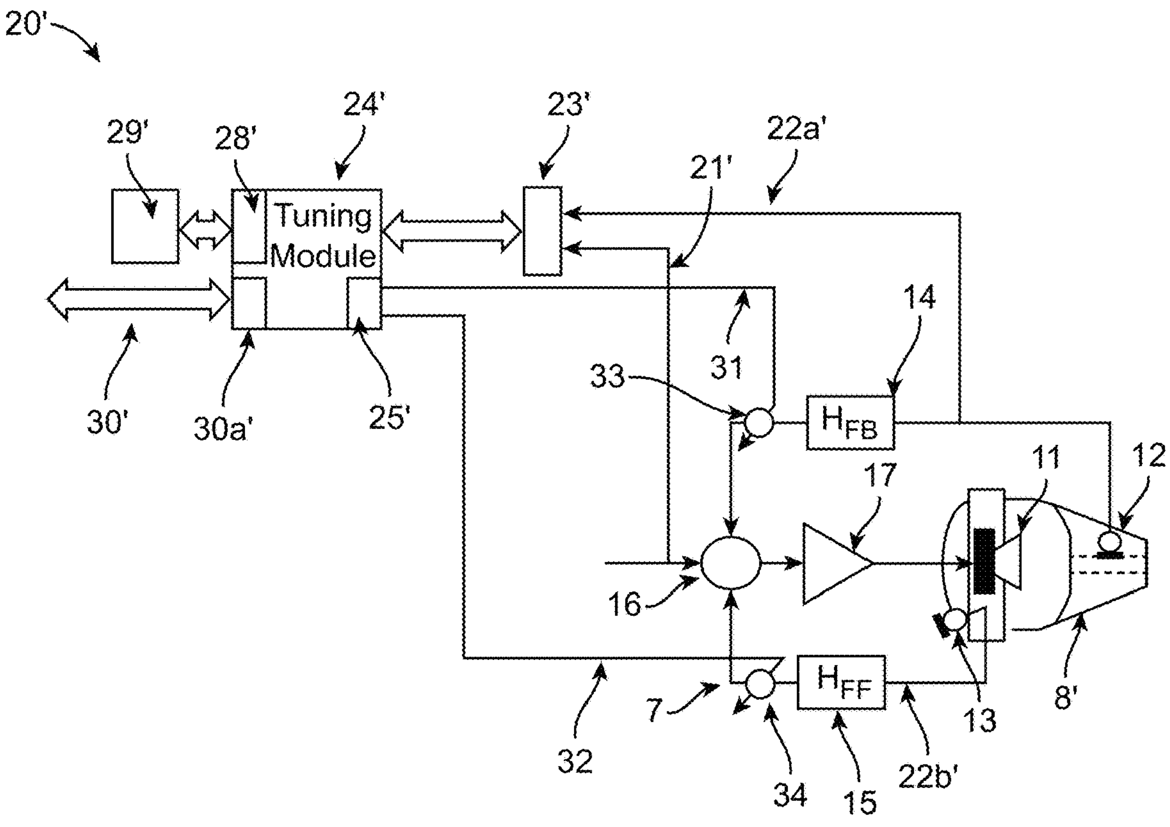
FIG. 11 is a schematic illustration of an active noise cancellation system, in accordance with some embodiments, in a first mode of operation.

FIG. 11 shows a further example of an active noise cancelling system 20' based on the active noise cancelling system 20 of FIG. 10 and incorporating the 'leaky bud' earphone 8' of FIG. 4 (corresponding features are labelled according), under the control of processing element 24' which operates to perform both supervisory system and tuning module functions. FIG. 11 shows active noise cancelling system 20' in a first mode of operation in which the modifications required to the feedback and feedforward filters 14, 15 are limited to simple scalar (gain) modifications and control outputs 31' and 32' are directed to multipliers 33 and 34 (e.g. gain amplifiers or attenuators provided as part of the feedback and feedforward circuitry) in the feedback and feedforward paths, respectively.

Figure 12:
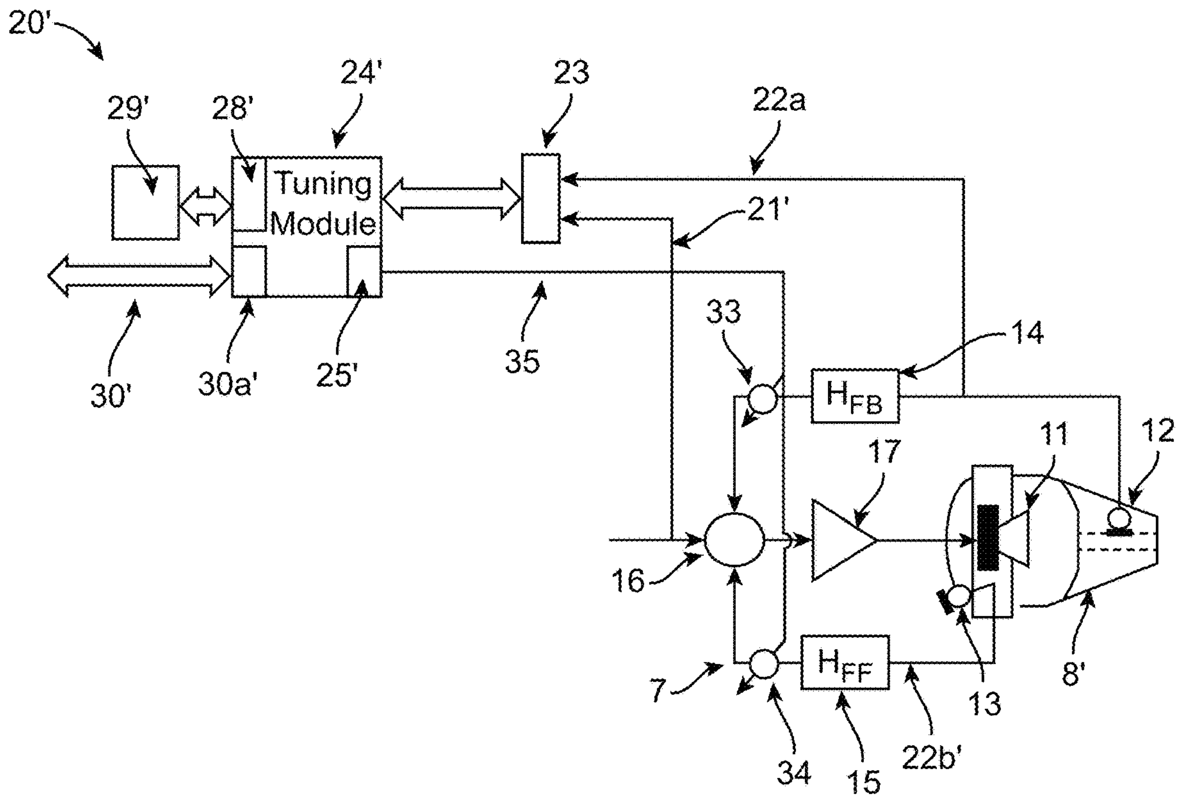
FIG. 12 is a schematic illustration of the system of FIG. 11 in a second mode of operation.

FIG. 12 shows the active noise cancelling system 20' in a second mode of operation in which the modifications required to the feedback and feedforward filters 14, 15 are again limited to simple scalar (gain) modifications but this time applied as a common factor to both feedback and feedforward paths. In this embodiment, a single control output 35 from the supervisory layer is sufficient to control both multipliers 33 and 34.

Figure 13:
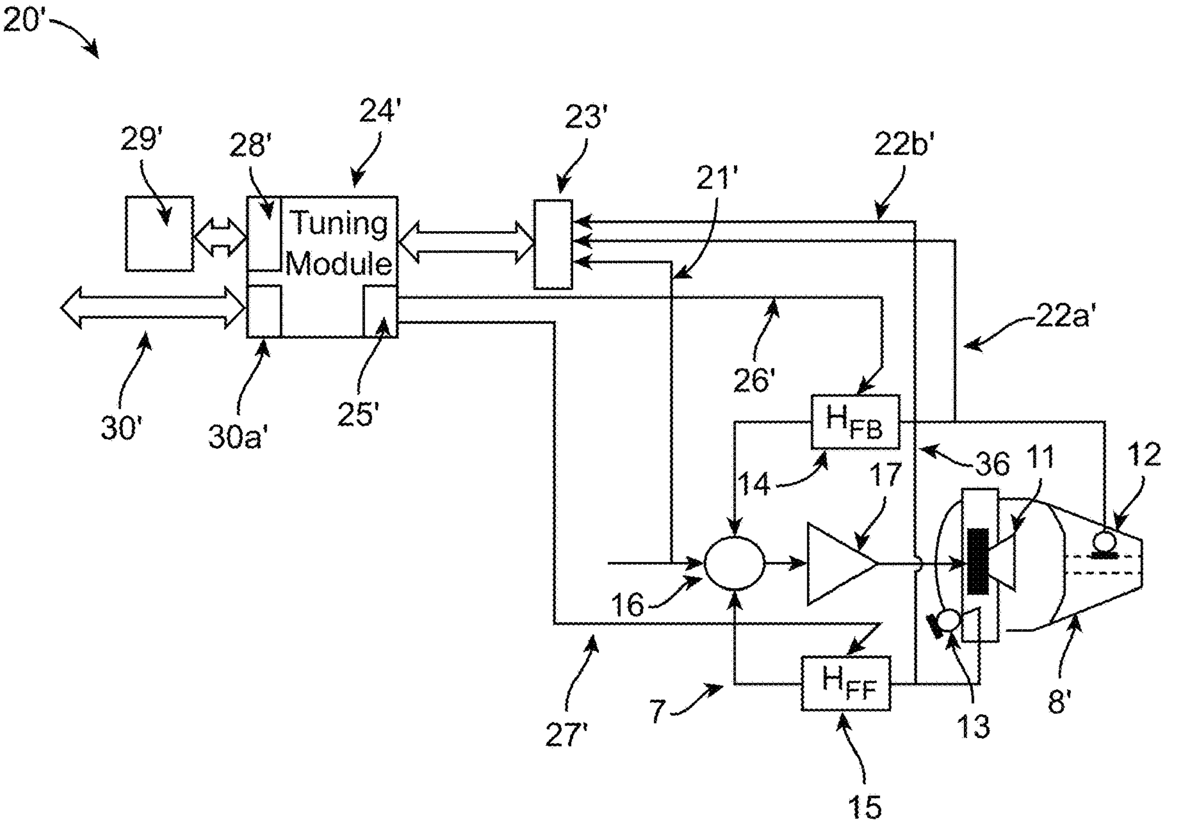
FIG. 13 is a schematic illustration of the system of FIG. 11 in a third mode of operation.

FIG. 13 shows the active noise cancelling system 20' in a third mode of operation in which there is an additional ability 36 to observe the external pressure at the feedforward' microphone through the data converter 23. This observation is provided as one means to assess the signal to noise ratio of the feedback plant estimates made by the supervisory system. External noise is one of the mechanisms prejudicing the transfer function estimation which is used in making the feedback plant estimate. Although the averaging and phase coherent methods work against this noise source, it is advisable to monitor external noise conditions and gate out measurements made in high ambient noise conditions.

With intimate connectivity to the User and/or Host interfaces 30 and explicit observation of the audio playback signal 21, the supervisory system is capable of operating only in the presence of a playback signal that has been intentionally selected by the user (such as when the user has turned on music playback or enabled a calibration mode of the earphone). Thus, the supervisory system will make updates to the control filters 14, 15 only in the presence of 'valid' information, avoiding 'hunting'. Alternatively, the supervisory system may request over the Host interface 30 the playback of a test signal and thus is capable of initiate a measurement of coupling to the ear (e.g. at power-on or at regular intervals if there is no audio playback).

In summary, the systems 20 and 20' provide a practical strategy, suitable for high-volume deployment in consumer applications, to correct the performance of an active noise control system in 'leaky bud' earphone. This correction allows a single 'tuning' of the system to be adapted, by simple modification, to be suitable for any ear. The modification required is sufficiently simple that it is capable of being performed automatically, by the earphone itself, in-situ.

Aspects of the present disclosure are capable of exploitation to allow the method to compensate for changes in performance of any earphone which naturally occur as an earphone moves within the ear of an individual wearer.

The present embodiments use a fixed filter solution, designed during product development for one 'reference' user and a simple rule which expresses how the reference solution is modified in application for different wearers. The change (of the reference control solution) required to retain good noise cancelling performance over a group of wearers can be as simple as a scalar adjustment; no radical filter redesign, adaptive filtering or computationally expensive processing is needed.

It has been observed that the principal change (relative to the reference) which can be observed within the frequency band of interest for active noise control when a 'leaky bud' earphone is placed in the ear of several wearers is a change in the low frequency receiving response of the system (which later in this specification shall be represented by the "feedback plant" response). This is a factor of the receiving response by which a user hears reproduced sound and the dominant component of the open loop response of a 'feedback' active noise reduction system.

It has further been observed that, over the same frequency band of interest, the ratio of the pressure outside the earphone to the pressure inside the earphone remains constant when measured on several ears remains rather constant, despite the variation in coupling to the individual's ears. This ratio might usefully be called the feedforward plant'.

The performance of the feedback control system on a new wearer can be recovered to that of the performance experienced by the reference user by changing the low frequency feedback loop gain by an amount equal to the observed change in the low frequency receiving sensitivity of the system. In many practical cases, where the feedback control system has been designed with adequate stability margin, this can simply be achieved by scaling the feedback loop gain by an amount equal to the observed deviation in other components of the open loop response.

In other cases, the low frequency feedback active control is dominated by the action of a multiplicative factor of the feedback control filter 14 having a 'peak' magnitude response, as in that of the canonical "peaking parametric EQ" filter with Laplace domain response:

$$H(s) = \frac{s^2 + \frac{A_0\omega_0}{Q_p}S + \omega_0^2}{s^2 + \frac{\omega_0}{Q_p}S + \omega_0^2}$$

where $\omega_0$ is the peak frequency, $Q_p$ is the quality factor of the peak and the height of the peak is $\log_{10}(A_0)$ dB.

In such cases, performance of the feedback control system on a 'new' wearer can be recovered to a level close to that of the performance experienced by the reference user by reducing the magnitude of the peak section response which is achieved by reducing $A_0$ by an amount proportional to the observed change in the low frequency receiving sensitivity of the system (some accompanying change in $Q_p$ may also be implemented).

Similarly, since the target feedforward filter 15 effectively involves the ratio of two elements (the feedback plant and the feedforward plant), one of which is not subject to wearer-to-wearer change, the performance of the feedforward control system on a new wearer can be recovered to that of the performance experienced by the reference user by changing the low frequency feedforward path gain by an amount equal to the observed deviation in the low frequency receiving sensitivity of the system from that observed on a 'reference' wearer. In many practical cases, where the feedforward control system has been designed with appropriate attention to the high frequency behaviour of the feedforward filter 15, this can simply be achieved by scaling the feedforward path gain.

In one embodiment, a reference tuning of the control filters 14, 15 of active noise cancelling system 20, 20' is provided for a median (or other representative) wearer and observations are made during wear of the low frequency acoustic coupling to the wearer's ear and compared with coupling to the reference ear. The comparison is expressed as a "deviation". The deviation D (dB) between the (magnitude) open-loop transfer function measured with the wearer and that expected on the reference wearer is estimated. The instantaneous low frequency loop gain of the system is adjusted by −D (dB) to correct the feedback noise cancellation performance.

In one embodiment, a reference tuning of the control filters 14, 15 of active noise cancelling system 20, 20' is provided for a median (or other representative) wearer and observations are made during wear of the low frequency open-loop transfer function of the system, by injection of an audio signal (for audio playback) or a signal designed for explicit test purposes and monitoring of the resulting response at the system's 'error microphone'. The deviation D (dB) between the (magnitude) open-loop transfer function measured with the wearer and that expected on the reference wearer is estimated. The instantaneous low frequency loop gain of the system is adjusted by −D (dB) to correct the feedback noise cancellation performance.

In another embodiment, a reference tuning of the control filters 14, 15 of active noise cancelling system 20, 20' is provided for a median (or other representative) wearer and observations are made during wear of the low frequency open-loop transfer function of the system, by injection of an audio signal (for audio playback or explicit test purposes) and monitoring of the resulting response at the system's 'error microphone'. The deviation D (dB) between the (magnitude) open-loop transfer function measured with the wearer and that expected on the reference wearer is estimated. The reference feedback control law, HFB, is modified such that its peak factor is attenuated by D (dB) to correct the feedback noise cancellation performance.

In one embodiment, a reference tuning of the control filters 14, 15 of active noise cancelling system 20, 20' is provided for a median (or other representative) wearer and observations are made during wear of the low frequency open-loop transfer function of the system, by injection of an audio signal (for audio playback or explicit test purposes) and monitoring of the resulting response at the system's 'error microphone', or by other means. The deviation D (dB) between the (magnitude) open-loop transfer function measured with the wearer and that expected on the reference wearer is estimated. The instantaneous loop gain of the system is adjusted by −D (dB) to correct the feedback noise cancellation performance, as the open-loop response of the system is such that adequate stability margin is retained.

In one embodiment, a reference tuning of the control filters 14, 15 of active noise cancelling system 20, 20' is provided for a median (or other representative) wearer and observations are made during wear of the low frequency open-loop transfer function of the system, by injection of an audio signal (for audio playback or explicit test purposes) and monitoring of the resulting response at the system's 'error microphone', or by other means. The deviation D (dB) between the (magnitude) open-loop transfer function measured with the wearer and that expected on the reference wearer is estimated. The instantaneous low frequency loop gain of the feedback control system is adjusted by −D (dB) to correct the feedback noise cancellation performance. The instantaneous low frequency path gain of the feedforward control system is adjusted by −D (dB) to correct the feedforward noise cancellation performance.

In one embodiment, the observations during wear of the low frequency open loop transfer function are made using records of i) the playback audio signal applied to the loudspeaker and ii) the feedback microphone signal. These signals are recorded in a synchronously sampled 'frame' of data, allowing moving, phase-coherent estimates of the transfer function between these two points to be made. Such transfer function estimates are made at regular intervals (200-500 ms) and at frequency or frequencies chosen to reveal most clearly the wearer dependency. The deviation from reference performance can be estimated at one frequency or averaged over several or a range of frequencies to increase the quality of the estimate and its robustness to noise.

FIG. 14 shows a yet further example of an active noise cancelling system 20" based on the active noise cancelling system 20 of FIG. 10 and incorporating a modified 'leaky bud' earphone 8" based on that of FIG. 4 (corresponding features are labelled according). As shown, earphone 8" includes a modified feedforward filter 15' includes adjustable filter sections 37 in cascade with a fixed filter 38 which operate under the control of processing element 24" which operates to perform both supervisory and tuning module functions.

Noise cancelling system 20" is configured to estimate the pressure gradient across the earphone concurrently observing both the external pressure at the feedforward microphone 13 via signal **22*b*" and the internal pressure at the feedback microphone 12 via signal 22*a*". This pressure gradient is compared with a reference value representing the expected value in normal fit conditions and the deviation (degree of deviation) will can be used as a measure of leak. This measure of leak can be used to adjust (via control outputs 26" and 27") the tuning of active noise cancelling circuitry 14', 15'** so as to compensate for the effects of leak.

In this embodiment the pressure gradient may be estimated by transfer function estimation methods between the feedback and feedforward microphone signals. Alternatively, the pressure gradient may be estimated by the difference in the power spectral densities of the feedback and feedforward microphone signals. In either of the aforementioned cases it is understood that the pressure gradient estimation is made in the frequency domain.

In one embodiment the adjustable filter 37 is implemented as a pair of biquadratic filters configured to permit independent adjustment of the gain of upper and lower portions of the frequency range of the feedforward controller 15'. In one embodiment, adjustable filter 37 comprises a low boost shelf and a high boost shelf and the crossover between the two is a fixed property of the design. The boost is a function of the determined deviation. In practical implementation, the boost may be a linear function of the determined deviation. Scaling in the boost functions for each of the two filters can introduce differential compensation of the upper and lower frequency regions of the feedforward controller 15'.

In practice, the adjustable filter 37 may range in complexity from a scalar multiplier (as previously taught in this specification) to a single biquadratic section implementing a shelving filter response or to a pair of biquadratic filters. Higher order filters may be exploited in 37, but this has been found to offer little practical advantage.

In the case of no leak, the adjustable filter 37 assumes unit transfer function, leaving non-trivial features of the feedforward filter defined only by the fixed element 38.

Figure 15:
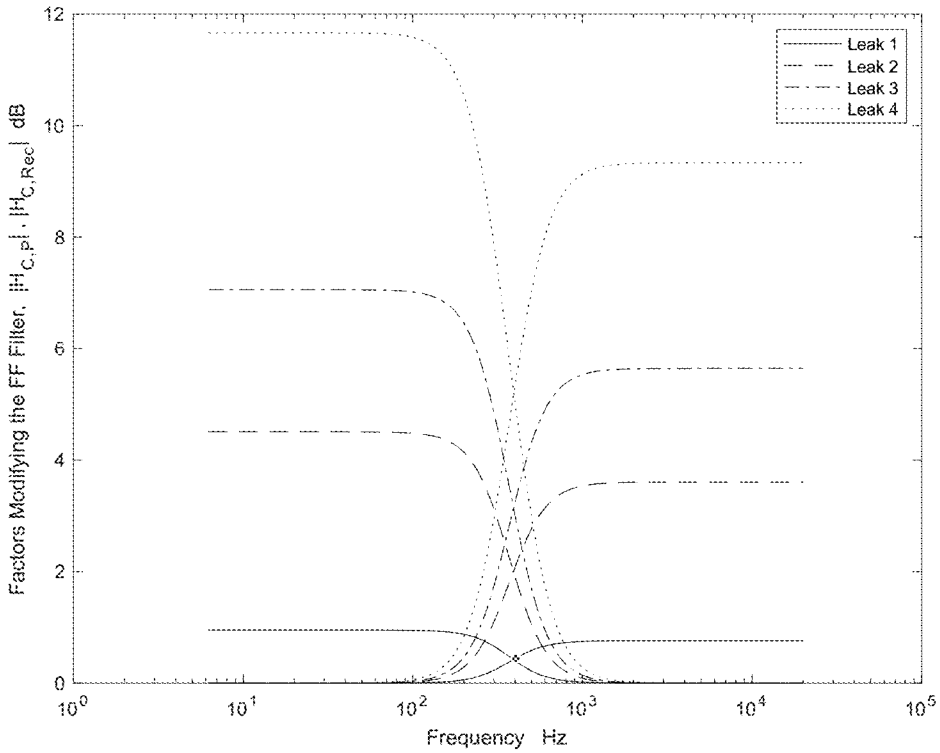
FIG. 15 shows magnitude frequency responses of a pair of biquadratic compensating filters for use in the active noise cancellation system of FIG. 14 when configured for various degrees of leak.

FIG. 15 shows a plot of the magnitude frequency response of the adjustable filter 37 in four different leak configurations. The adjustable filter 37 in this instance is implemented by a cascade of two biquadratic filters. The first group of filter responses (the left-hand set of four lines in the graph) is intended to compensate for disruption of the receiving response of the earphone caused by leak; it is a low-frequency effect. The second group of filter responses (the right-hand set of four lines in the graph) is intended to compensate for disruption of the feedback plant response of the earphone caused by leak.

Figure 16:
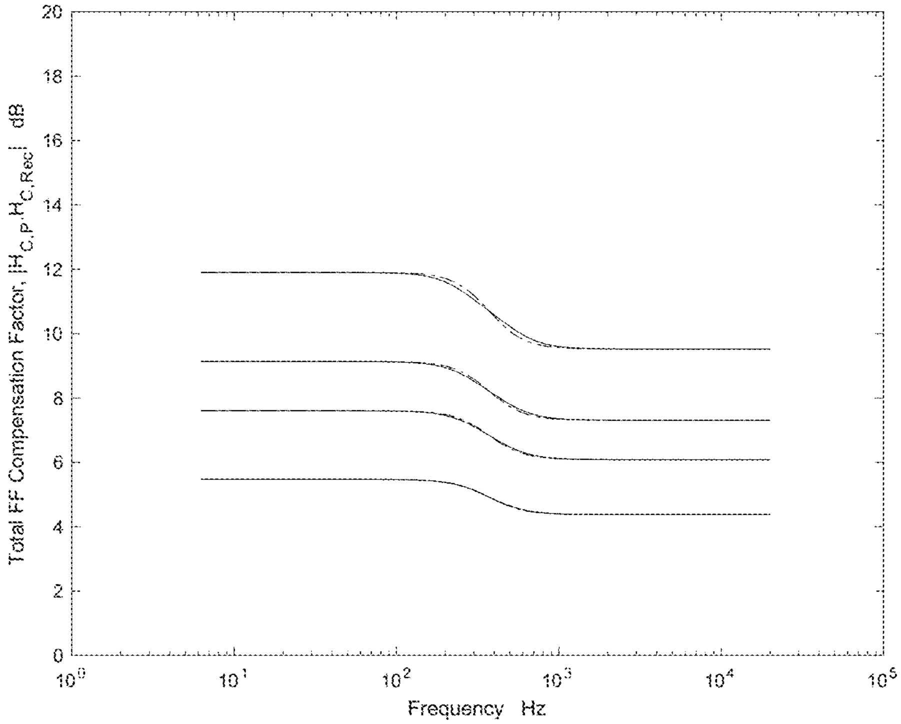
FIG. 16 shows the overall magnitude frequency responses of a single biquadratic compensating filter for use in the active noise cancellation system of FIG. 14 configured for various degrees of leak.

FIG. 16 shows a plot of the magnitude frequency response of the adjustable filter 37 in four different leak configurations. The adjustable filter 37 in this instance is implemented by a single biquadratic filter, offering controllable shelving boost. The 'sigmoidal' shape of the response is formed from the product of two biquadratic filter responses of the form seen in FIG. 15 and imparts attenuation to upper frequency portions of the frequency range of the feedforward controller which assists in preventing unwanted noise enhancement during leak compensation; thus, this system offers the same degree of compensation. The responses associated with the product of two biquadratic filters are seen as the continuous trace and entirely acceptable single-filter realisations are shown in the dash-dot traces. The single-filter solutions are more efficient to realise in practice. The filter is a low-boost shelf design and the shelf corner frequency is a fixed property of the design. The 'boost' and 'gain' are functions of the determined deviation. In practical implementation, the boost and gain may be linear functions of the determined deviation.

FIG. 17 shows a plot of the magnitude frequency response of the adjustable filter 37 in four different leak configurations. The adjustable filter 37 in this instance is implemented by a single biquadratic filter, offering fixed shelving boost; only the gain is a function of the determined deviation. Again, this filter permits adjustment of the feedforward controller and its sigmoidal shape imparts a fixed attenuation to upper portions of the frequency range of the feedforward controller, which assists in preventing unwanted noise enhancement during leak compensation. The filter is a low-boost shelf design and the shelf corner frequency is a fixed property of the design. The gain is a function of the determined deviation. In practical implementation, the gain may be a linear function of the determined deviation.

In all embodiments described above, adjustment of the tuning of active noise cancelling circuitry to compensate for the effects of leak is understood to be operative at generally low frequencies (e.g. frequencies below 800 Hz), with maximum effect at frequencies in order of 100 to 200 Hz. This is also a frequency range where the feedback plant response has been observed to be weakly related to or completely independent of leak in several earphone types. However, the adjustment may be achieved on the basis of observation of the degree of deviation between measures of acoustic coupling between the earphone and the wearer's ear and a reference, expected value of this acoustic coupling at a substantially different frequency to the lower frequencies at which leak compensation of active noise compensation may be expected to operate. Importantly, this different frequency may be significantly higher than 100 to 200 Hz, typically 800 Hz or 2.1 kHz. This is true both when the measure of acoustic coupling is derived from voltage ratios between the voltage input to the electro-acoustic driver 11 and voltage output from the feedback microphone 12 and when the measure of acoustic coupling is derived from pressure ratios between the feedback microphone pressure and the feedforward microphone pressure. These higher observation frequencies are regimes in which both the feedforward plant response and the receiving response are functionally related to the leak. However, changes in the low frequency receiving response, otherwise difficult to directly instrument, can be made through observation of the high frequency feedforward plant response and exploiting correlation between these two functions.

To illustrate this point, FIG. 18 shows measurements of the magnitude feedforward plant response at 805 Hz and the (simultaneous) receiving frequency response at 150 Hz for an earphone in nominal fit and in four conditions of leak. The test was made on 8 human ears. It is seen that there is clear correlation between the two parameters; the dashed line is a least-squares linear fit of the data. This indicates that an observation of behaviour at 805 Hz (in this case the pressure gradient) can be used to provide indirect observation of the receiving frequency response at 150 Hz. Using this indirect, derived information, the tuning of active noise cancelling circuitry to compensate for the effects of leak can proceed, including by the adjustment of filters as taught previously.

The invention claimed is:

1. An active noise cancelling system comprising:
- an earphone comprising:
  - an electro-acoustic driver; and
  - at least one sensing microphone;
- tunable active noise cancelling circuitry operative to receive a signal from the at least one sensing microphone, the tunable active noise cancelling circuitry being pre-configured in a standard tuning for a reference ear and comprising at least one noise-control filter; and
- a tuning module operative to configure the earphone for an individual wearer by:
  - comparing an acoustic coupling of the earphone to the individual wearer's ear with an acoustic coupling of the earphone to the reference ear to determine a deviation in acoustic coupling based at least in part on an expected voltage ratio associated with the reference ear; and modifying the tunable active noise cancelling circuitry by a predetermined degree based on the determined deviation in acoustic coupling.

2. The system of claim 1, wherein the at least one sensing microphone comprises a feedback microphone and the at least one noise-control filter comprises a feedback control filter.

3. The system of claim 2, wherein the tuning module is operative to:

determine a voltage ratio of voltage supplied to the electro-acoustic driver and a resulting voltage generated at the feedback microphone;

determine a degree of deviation between the determined voltage ratio and the expected voltage ratio associated with the reference ear; and modify the tunable active noise cancellation circuitry based on the degree of deviation between the determined voltage ratio and the expected voltage ratio.

4. The system of claim 2, wherein the at least one sensing microphone comprises a feedforward microphone and the at least one noise-control filter comprises a feedforward control filter.

5. The system of claim 4, wherein the tuning module is operative to:

determine a pressure gradient based on a difference in pressure readings between the feedback microphone and the feedforward microphone; and determine a degree of deviation between the determined pressure gradient and an expected pressure gradient associated with the reference ear, the tunable active noise cancellation circuitry being modified based on the degree of deviation between the determined pressure gradient and the expected pressure gradient.

6. The system of claim 4, further comprising a supervisory component configured to observe an audio signal, the tuning module being configured to determine the deviation in acoustic coupling only while the supervisory component observes the audio signal.

7. The system of claim 6, wherein the supervisory component is operative to monitor for a presence of the audio signal.

8. The system according to claim 6, wherein the supervisory component is operative to request the audio signal.

9. The system of claim 6, wherein the supervisory component is further configured to:

monitor an external ambient pressure sensed by the feedforward microphone and compare the external ambient pressure to an audio playback level; and prevent operation of the tuning module if a ratio of the audio playback level to external ambient pressure is below a threshold value.

10. The system of claim 6, wherein the supervisory component is further configured to:

determine whether an external ambient pressure is sensed by the feedforward microphone; and prevent operation of the tuning module when no external ambient pressure is sensed by the feedforward microphone.

11. The system of claim 2, wherein the tuning module is operative to modify a dominant peak section of the feedback control filter in proportion to the determined deviation in acoustic coupling.

12. The system of claim 1, wherein the tunable active noise cancelling circuitry comprises a variable gain device operative to apply a multiplier to a signal supplied to or from the noise-control filter.

13. The system of claim 12, wherein the tuning module is operative to modify a gain change of the variable gain device in proportion to the detected deviation.

14. The system of claim 1, wherein the tuning module is operative to determine the deviation in acoustic coupling by comparing a low frequency acoustic coupling of the earphone to the wearer's ear with a low frequency acoustic coupling of the earphone to the reference ear.

15. The system of claim 14, wherein the tuning module is operative to compare a low frequency transfer function of the system to the individual wearer's ear with a low frequency transfer function of the system to the reference ear.

16. The system of claim 1, wherein the tuning module is operative to modify an aspect of the at least one noise-control filter in proportion to the determined deviation in acoustic coupling.

17. The system of claim 1, further comprising a memory operative to store the determined deviation in acoustic coupling or a tuning value associated therewith.

18. The system of claim 1, wherein the tuning module is configured to determine the deviation in acoustic coupling at a plurality of different frequency ranges and modify the tunable active noise cancelling circuitry based on an average of the determined deviations in acoustic coupling.

19. The system of claim 1, wherein the tuning module is configured to repeatedly determine the deviation in acoustic coupling.

20. The system of claim 19, wherein the tuning module is configured to determine the deviation in acoustic coupling at regular intervals.

21. The system of claim 1, wherein the tuning module is further operative to:

compare the acoustic coupling of the earphone to the individual wearer's ear with the acoustic coupling of the earphone to the reference ear over a first frequency range; and adjust a performance of the tunable active noise cancelling circuitry over a second frequency range that is higher than the first frequency range.

22. A method of configuring an earphone for an individual wearer, comprising:

comparing an acoustic coupling of the earphone to the individual wearer's ear with an acoustic coupling of the earphone to a reference ear to determine a deviation in acoustic coupling based at least in part on an expected voltage ratio associated with the reference ear; and modifying, by a predetermined degree, tunable active noise cancelling circuitry coupled to the earphone based on the determined deviation in acoustic coupling, the tunable active noise cancelling circuitry being preconfigured in a standard tuning for the reference ear and operative to receive a signal from at least one sensing microphone disposed on the earphone.

23. The method of claim 22, wherein the at least one sensing microphone includes a feedback microphone and the comparing of the acoustic coupling of the earphone to the individual wearer's ear with the acoustic coupling of the earphone to the reference ear comprises:

determining a voltage ratio of voltage supplied to an electro-acoustic driver of the earphone and a resulting voltage generated by the feedback microphone; and determining a degree of deviation between the determined voltage ratio and the expected voltage ratio associated with the reference ear, the tunable active noise cancellation circuitry being modified based on the degree of deviation between the determined voltage ratio and the expected voltage ratio.

24. The method according to claim 23, wherein the at least one sensing microphone further includes a feedforward microphone and the comparing of the acoustic coupling of the earphone to the individual wearer's ear with the acoustic coupling of the earphone to the reference ear comprises:

determining a pressure gradient based on a difference in pressure readings between the feedback microphone and the feedforward microphone; and determining a degree of deviation between the determined pressure gradient and an expected pressure gradient associated with the reference ear, the tunable active noise cancellation circuitry being modified based on the degree of deviation between the determined pressure gradient and the expected pressure gradient.

25. The method of claim 24, wherein the deviation in acoustic coupling is determined only while an audio signal is observed by a supervisory component.

26. The method of claim 25, further comprising:

monitoring for a presence of the audio signal via the supervisory component.

27. The method of claim 25, further comprising:

monitoring an external ambient pressure sensed by the feedforward microphone and comparing the external ambient pressure to an audio playback level; and preventing modification of the tunable active noise cancelling circuitry if a ratio of the audio playback level to external ambient pressure is below a threshold value.

28. The method of claim 25, further comprising:

determining whether an external ambient pressure is sensed by the feedforward microphone; and preventing modification of the tunable active noise cancelling circuitry when no external ambient pressure is sensed by the feedforward microphone is.

29. The method of claim 22, wherein the acoustic coupling of the earphone to the individual wearer's ear is compared with the acoustic coupling of the earphone to the reference ear over a first frequency range, and the tunable active noise cancelling circuitry is modified over a second frequency range that is higher than the first frequency range.

* * * * *